United States Patent
Feldbaum et al.

(10) Patent No.: US 7,159,302 B2
(45) Date of Patent: Jan. 9, 2007

(54) METHOD FOR MANUFACTURING A PERPENDICULAR WRITE HEAD

(75) Inventors: Michael Feldbaum, San Jose, CA (US); Quang Le, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 416 days.

(21) Appl. No.: 10/813,836

(22) Filed: Mar. 31, 2004

(65) Prior Publication Data
US 2005/0219744 A1  Oct. 6, 2005

(51) Int. Cl.
*G11B 5/127* (2006.01)
*G11B 5/147* (2006.01)
*C23C 14/00* (2006.01)

(52) U.S. Cl. ............................... 29/603.12; 29/603.13; 29/603.14; 29/603.15; 29/603.18; 360/126; 204/192.32; 204/192.33; 204/192.34

(58) Field of Classification Search ............. 29/603.12, 29/603.14, 603.18, 603.15, 603.13; 360/126, 360/122, 321; 204/192.32, 192.33, 192.34
See application file for complete search history.

(56) References Cited

U.S. PATENT DOCUMENTS

| | | | |
|---|---|---|---|
| 5,225,953 A | | 7/1993 | Wada et al. |
| 5,483,403 A | * | 1/1996 | Voegeli ................... 360/321 |
| 5,572,392 A | * | 11/1996 | Aboaf et al. ............. 360/126 |
| 5,717,630 A | * | 2/1998 | Koshikawa et al. ....... 365/151 |
| 6,239,955 B1 | * | 5/2001 | Dovek et al. .............. 360/321 |
| 2002/0080524 A1 | | 6/2002 | Takahashi et al. |

FOREIGN PATENT DOCUMENTS

| | | |
|---|---|---|
| JP | 57117119 | 7/1982 |
| JP | 58150120 | 9/1983 |
| JP | 60154309 | 8/1985 |
| JP | 6117714 | 6/1986 |
| JP | 1986-149106 | 9/1986 |
| JP | 62262213 | 11/1987 |
| JP | 63029311 | 2/1988 |
| JP | 3209609 | 9/1991 |
| JP | 2003016608 | 1/2003 |

* cited by examiner

*Primary Examiner*—A. Dexter Tugbang
*Assistant Examiner*—Tai Van Nguyen
(74) *Attorney, Agent, or Firm*—Rambod Nader; Dillon & Yudell LLP

(57) ABSTRACT

A method for manufacturing a write head having a small write pole tip that emits magnetic flux sufficient for effective perpendicular recording. The method creates a leading edge taper (LET) between the write pole tip and a magnetic flux guide to create a sufficient magnetic flux in the write pole. The LET is fabricated by ion milling away a sacrificial striated material whose layers have different rates of ion milling. The top layer of material thus mills away faster than lower layers, creating the required tapering of a negative mold. An endpoint material stops the milling. The LET magnetic material is then spattered into the negative mold, resulting in a well defined taper of magnetic flux shaping material extending the magnetic flux guide to the write pole tip, such that the write pole tip is able to emit sufficient magnetic flux for perpendicular recording.

10 Claims, 14 Drawing Sheets

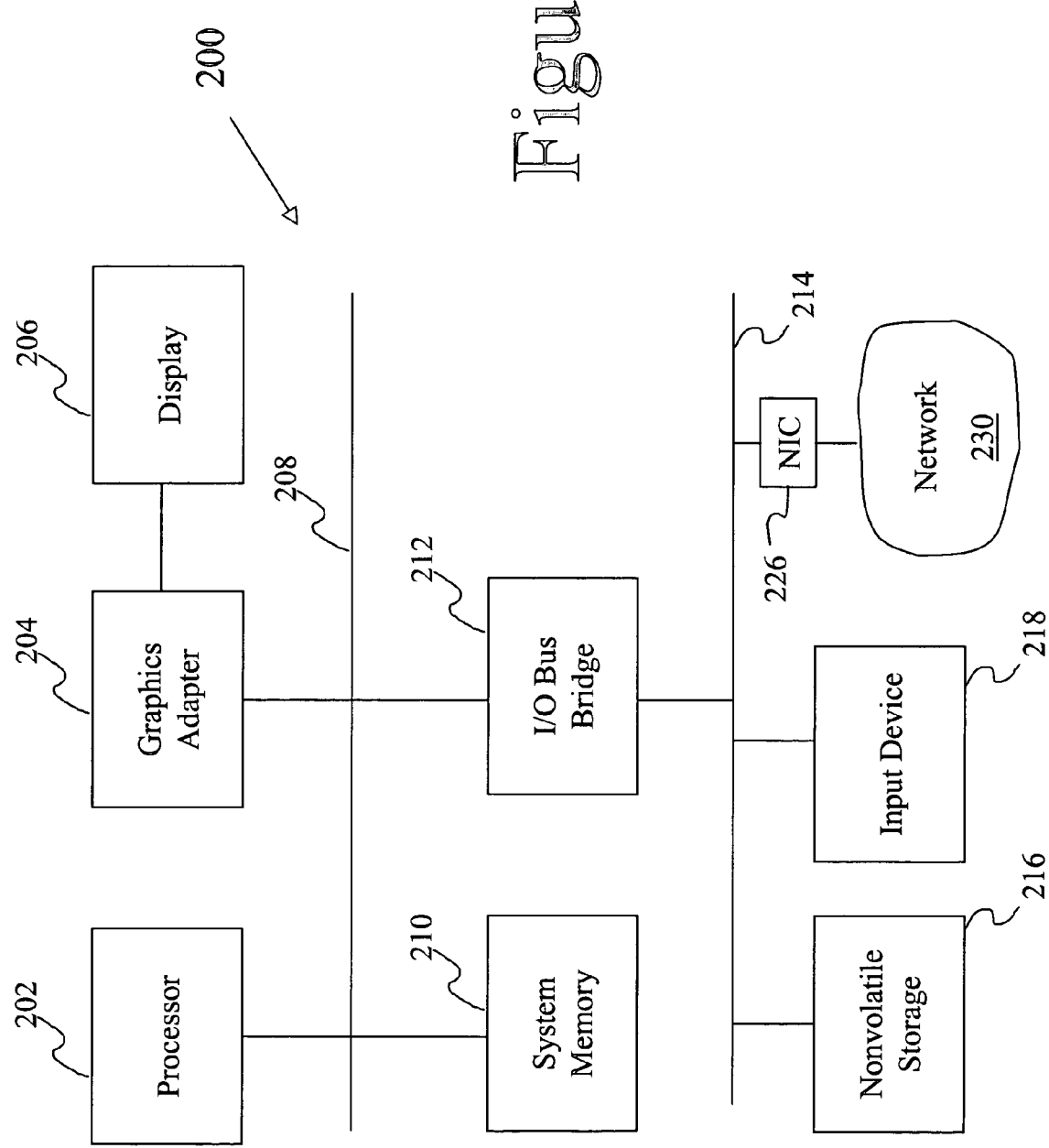

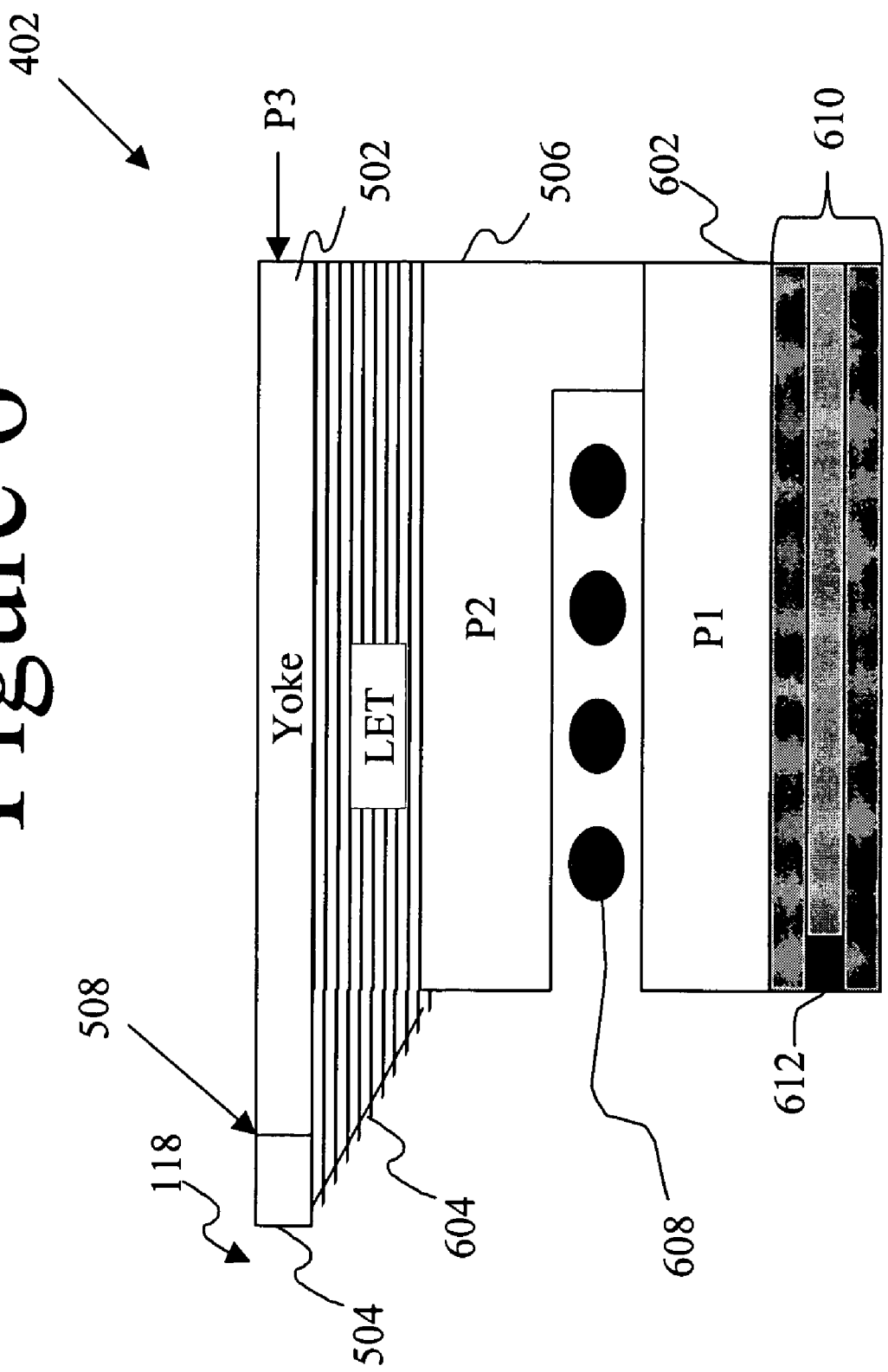

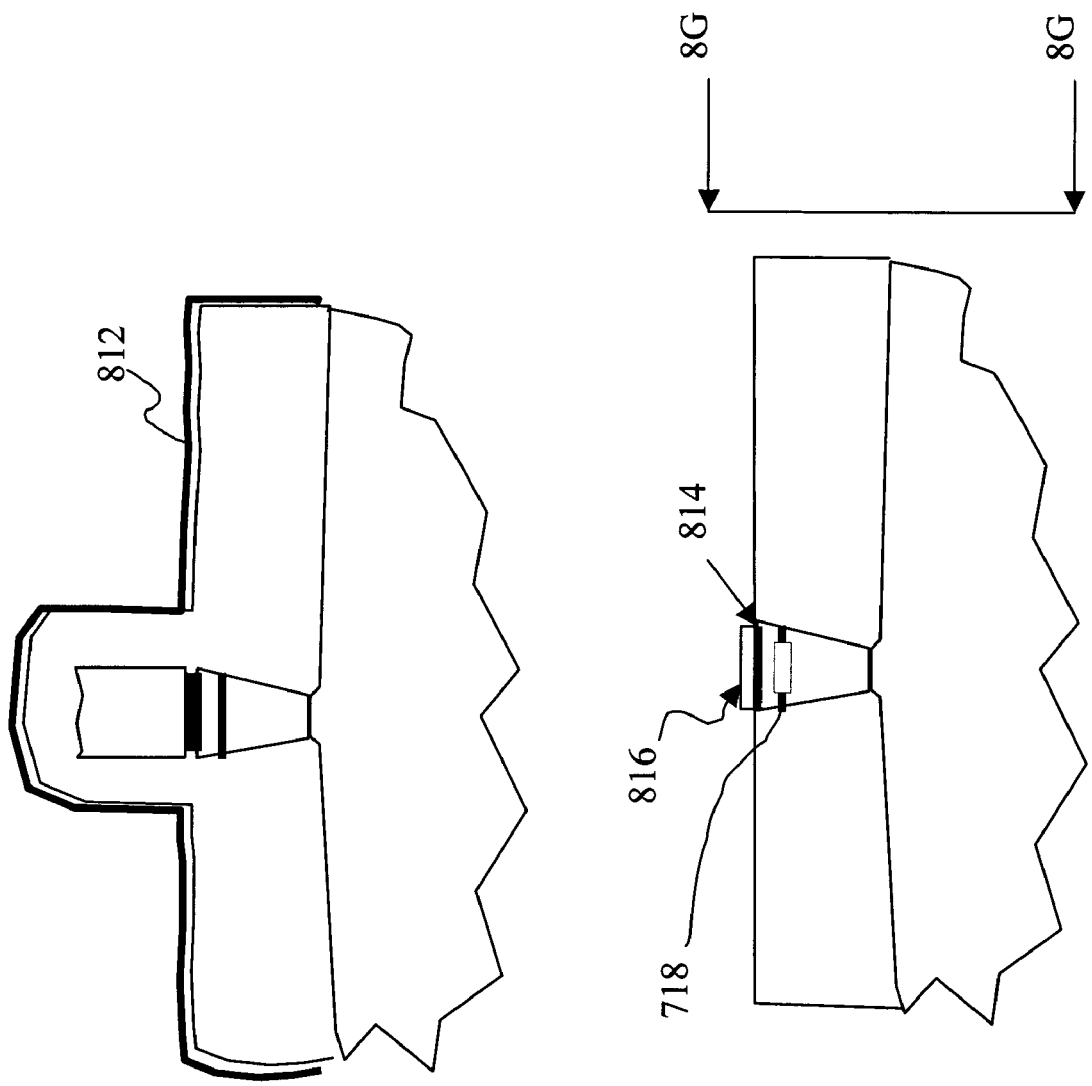

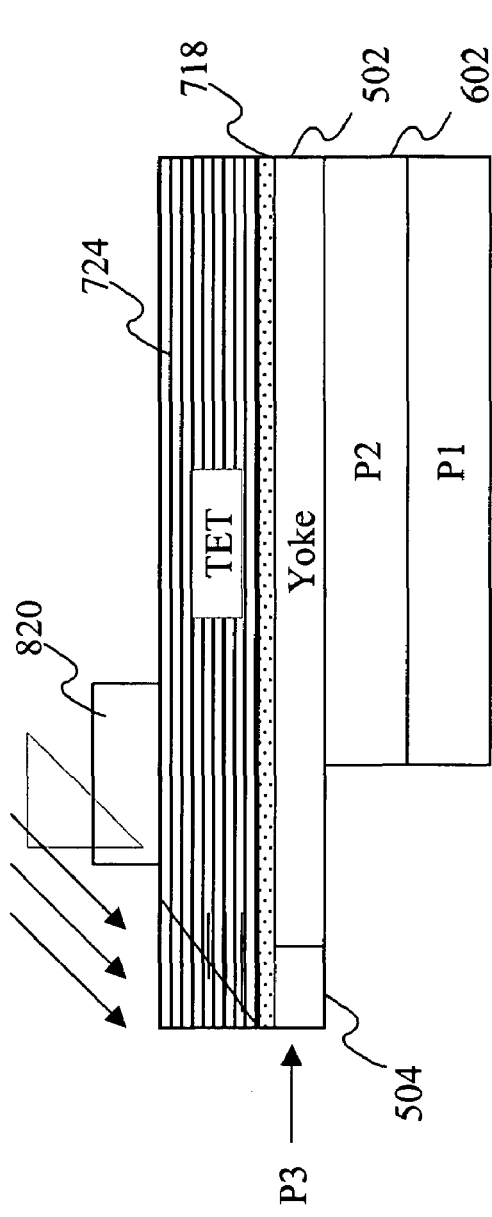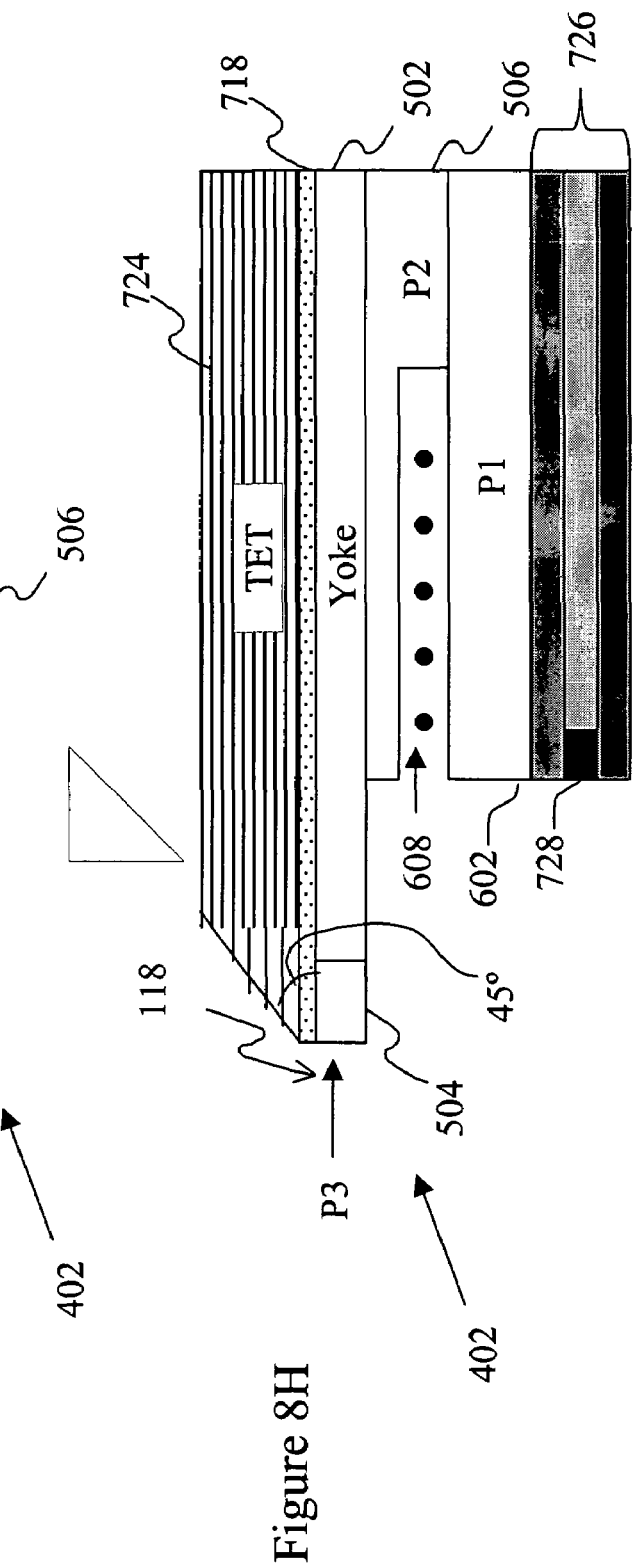
Figure 8G
Figure 8H

METHOD FOR MANUFACTURING A PERPENDICULAR WRITE HEAD

BACKGROUND OF THE INVENTION

1. Technical Field

The present invention relates in general to storage systems, and in particular disk drives. Still more particularly, the present invention relates to a method of fabricating a write head for use with perpendicular magnetic recording.

2. Description of the Related Art

A hard disk drive (HDD) is a digital data storage device that writes and reads data via magnetization changes of a magnetic storage disk along concentric tracks. As application programs and operating systems become longer with more lines of program code, and data files, particularly graphics files, become larger, the need for additional storage capacity on the HDD increases. Since the trend in HDD design is towards the use of smaller, rather than larger, disks, the solution to increasing the storage capacity of magnetic storage disks is to increase the areal density of data stored on the disk.

Currently, there are two main types of magnetic storage on a magnetic disk: longitudinal and perpendicular. FIGS. 1a and b depict these two types of storage. FIG. 1a depicts the older technology of longitudinal recording. Longitudinal recorded bits 100 are stored when a longitudinal write head 102 magnetizes areas of a magnetic disk 104 in an orientation that is longitudinal to a track 118 on the magnetic disk 104. As shown, the magnetic moment of each subsequent recorded bit is opposing, such that each north pole faces a south pole and vice versa. These opposing moments result in a repulsive force, which leads to long-term instability of the magnetized areas, thus leading to eventual lost data. Nonetheless, longitudinal recording has traditionally been the accepted method of storage because of the materials used to fabricate magnetic disk 104 and the technological limitations on how small a pole tip of longitudinal write head 102 can be and still produce enough flux field to write data.

Modern disk fabrication materials have paved the way for perpendicular recording. These disk fabrication materials typically use a cobalt-chromium ferromagnetic thin film on an amorphous ferromagnetic thin film. This combination of materials affords both ultra-high recording performance along with high thermal stability. The concept of perpendicular recording is illustrated in FIG. 1b. Perpendicular-recorded bits 106 are stored on a perpendicular recording medium 108 as anti-parallel magnets in relation to one another in an orientation that is normal (perpendicular) to the surface of the perpendicular recording medium 108. Because the perpendicular-recorded bits 106 obey the pull of magnetic poles, they do not have the repulsive force of longitudinal recordings, and thus the perpendicular-recorded bits 106 are more stable.

While materials used to construct perpendicular recording medium 108 address part of the technological challenge of perpendicular recording, the other challenge is to fabricate a perpendicular write head 110 having a write pole tip 112 whose tip area is small enough to record the perpendicular-recorded bit 106 without overlapping an area reserved for another perpendicular-recorded bit 106. This overlap must be avoided not only for bit areas on a same track 120, but on bit areas on other tracks (not shown) as well. Thus, the aspect ratio (AR) of linear density (bits per inch—BPI) to track density (tracks per inch—TPI) should be controlled at 1:1 (BPI:TPI) or at most 2:1 to avoid adjacent track interference (ATI).

Furthermore, and more technically challenging, the perpendicular write head 110 must be able to produce a magnetic field that is powerful enough to magnetize an area for a perpendicular-recorded bit 106 without overwriting other bit areas or having to be so close to the surface of perpendicular recording medium 108 as to make head crashes likely.

As write pole tip 112 is scaled to tighter dimensions and constrained by the AR requirements described above, the amount of write field coming out at the tip of write pole tip 112 is attenuated and insufficient to magnetize the bit fields.

Two approaches that have been proposed to bring higher write flux to P3's write pole tip 112 are aggressive flare point and aggressive flux guide throat height in shaping layer 116 (P2). Experimental results have shown the tremendous difficulty in implementing aggressive flare point and P2 placement without encountering track-width variation and adjacent track interference (ATI). The ability to simultaneously control both flare point and track-width using ion milling approach is difficult due to the physical nature of this destructive method and the specification targeted. Equally challenging in bringing the flux guide layer closer to the Air Bearing Surface (ABS) are Adjacent Track Issues (ATI). (As is known to those skilled in the art of hard disk drives, as a disk spins under a read/write head, the small space between the read/write head and the disk is maintained by pressure of air passing between the read/write head and the disk surface, creating an "Air Bearing Surface," or ABS.) The P2 structure is much bigger in area at the ABS view as compared to the write pole. Effective write field, generated by an applied current, would prefer to leak from P2's surface closest to and facing the air bearing surface (ABS) instead of being funneled toward the pole tip. When P2 is brought closer to the ABS, it will bring more fields to the pole tip, but also adversely contribute significantly to ATI issues such as side writing and side erasure.

What is needed, therefore, is a perpendicular write head that has a very small write pole tip that is able to generate sufficient flux fields for magnetizing data bits areas without ATI issues, and a method to manufacture such a write head.

SUMMARY OF THE INVENTION

In view of the foregoing, the present invention provides a method for manufacturing a write head having a small write pole tip that emits magnetic flux sufficient for effective perpendicular recording. The method creates a leading edge taper (LET) between the write pole tip and a magnetic flux guide to create a sufficient magnetic flux in the write pole. The LET is fabricated by ion milling away a sacrificial striated material whose layers have different rates of ion milling. The top layer of material thus mills away faster than lower layers, creating the required tapering of a negative mold. An endpoint material stops the milling. The LET magnetic material is then spattered into the negative mold, resulting in a well defined taper of magnetic flux shaping material extending the magnetic flux guide to the write pole tip, such that the write pole tip is able to emit sufficient magnetic flux for perpendicular recording. The LET thus reduces P2 shaping layer's x-width to minimize adjacent tracking interference (ATI).

This method creates a write head that brings a more effective write field to the P3 pole tip and relaxes the stringent requirement to bring the flare point and P2 closer to the ABS to achieve higher effective write field. The effectiveness of tapering is best achieved when the tapering is self-aligned to P3 and the tapering angle is optimized at forty-five to fifty degrees.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2 is a block diagram of a preferred embodiment of a data processing system using a hard disk drive (HDD) that incorporates an inventive write head;

FIG. 6 depicts a side view of a preferred embodiment of the inventive write head;

FIGS. 8A–H illustrate inventive steps taken to fabricate a write head having a trailing edge taper for guiding flux to a write pole.

DETAILED DESCRIPTION OF A PREFERRED EMBODIMENT

Figures 1A, 1B:
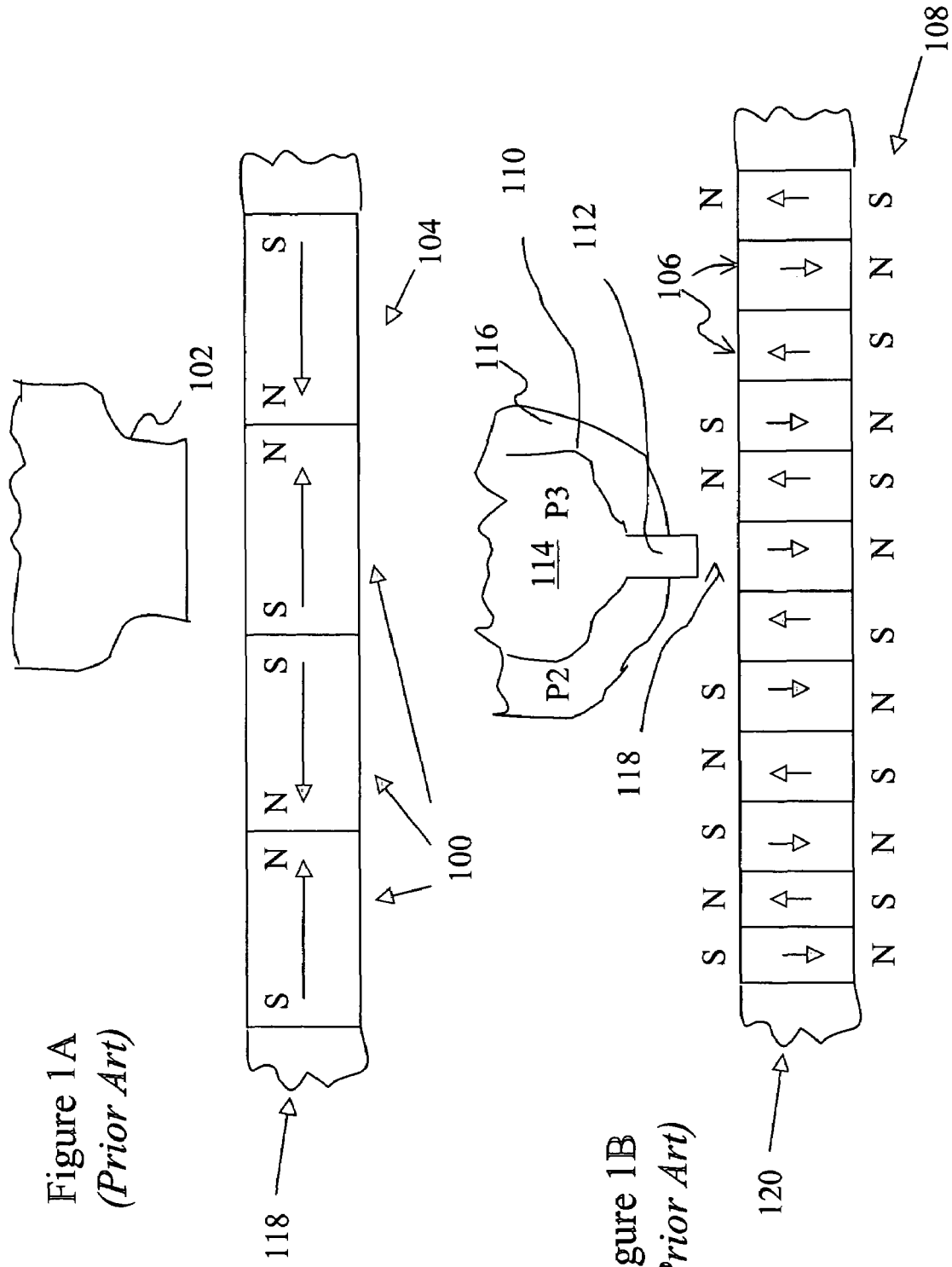
FIG. 1a depicts a prior art longitudinal storage on a magnetic disk.
FIG. 1b illustrates a prior art perpendicular storage on a magnetic disk.

With reference now to FIG. 2, there is depicted a block diagram of a preferred embodiment of a data processing system 200 using the present inventive write head in a disk drive. Data processing system 200 includes a processor 202, which is connected to a system bus 208. In the exemplary embodiment, data processing system 200 includes a graphics adapter 204, also connected to system bus 208, for receiving information for display 206.

Also connected to system bus 208 are a system memory 210 and an input/output (I/O) bus bridge 212. I/O bus bridge 212 couples an I/O bus 214 to system bus 208, relaying and/or transforming data transactions from one bus to the other. Peripheral devices such as nonvolatile storage 216, which may be a hard disk drive, floppy drive, a compact disk read-only memory (CD-ROM), a digital video disk (DVD) drive, or the like, and input device 218, which may include a conventional mouse, a trackball, or the like, is connected to I/O bus 214. Data processing system 200 connects with a network 230 via a network interface card (NIC) 226 as shown.

Network 230 may be the Internet, an enterprise confined intranet, an extranet, or any other network system known to those skilled in the art of computers.

The exemplary embodiment shown in FIG. 2 is provided solely for the purposes of explaining the invention and those skilled in the art will recognize that numerous variations are possible, both in form and function. For instance, data processing system 200 might also include a sound card and audio speakers, and numerous other optional components. All such variations are believed to be within the spirit and scope of the present invention.

Figure 3A:
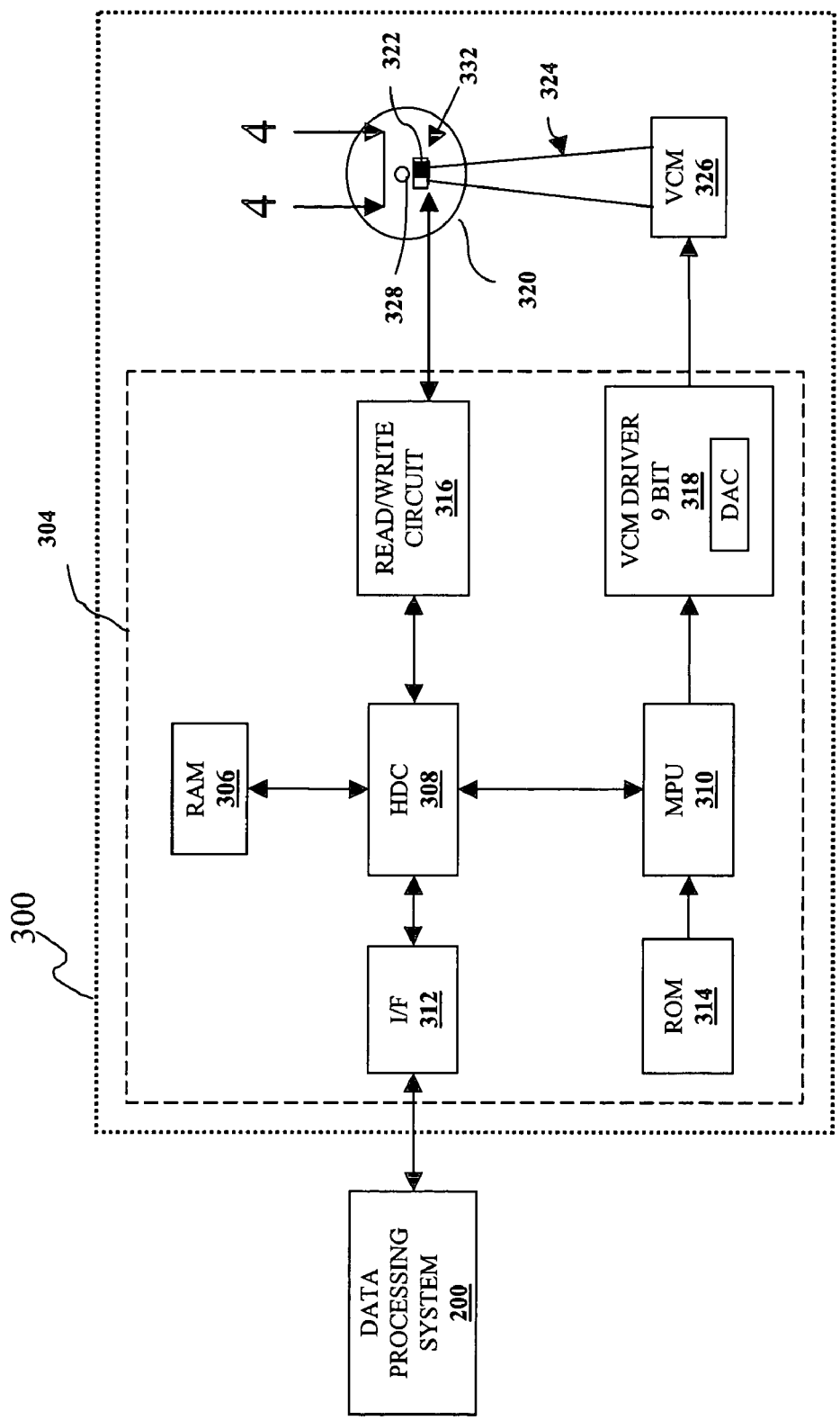
FIG. 3a depicts additional detail of the HDD that uses the inventive write head.

With reference now to FIG. 3a, there is depicted additional detail of a hard disk drive (HDD) 300 as contemplated by the present invention for use as nonvolatile storage 216 illustrated in FIG. 2. HDD 300 has a set of hard disks 320, which are rigid platters composed of a substrate and a magnetic medium. Since the substrate is non-magnetic, both sides of each hard disk 320 can be coated with the magnetic medium so that data can be stored on both sides of each hard disk 320.

An actuator arm 324 moves a slider 332, which is gimbal mounted to the actuator arm 324. The slider 332 carries a magnetic read/write head 322 to a specified lateral position above the surface of the hard disk 320 when a Voice Coil Motor (VCM) 326 swings the actuator arm 324.

Data reads/writes between a data processing system 200 and magnetic read/write head 322 are under the control of a controller 304. Controller 304 includes an interface (I/F) 312 coupled to data processing system 200. Coupled to I/F 312 is a Hard Disk Controller (HDC) 308, which coordinates read/write operations, and controls modes of operation of HDD 300.

Coupled to a HDC 308 is a random access memory 306, which caches data to be read/written on hard disk 320. Read/write circuit 316 includes an Analog-to-Digital Converter (ADC) and a Digital-to-Analog Converter (DAC). The ADC is used to convert analog signals into digital signals for reads from the hard disk 320. The DAC is used to convert digital values into appropriate analog signals for writes to the hard disk 320. A MicroProcessor Unit (MPU) 310, under the control of a micro-program stored in a Read Only Memory (ROM) 314, controls a VCM driver 318. VCM driver 318 controls movement of the VCM 326 using a 9-bit DAC, which converts a digital control signal from MPU 310 into an analog control signal for VCM 326. Typically, VCM driver 318 also works in coordination with a controller (not shown) for spindle 328, to provide proper positioning of read/write head 322 above the surface of hard disk 320 during read/write operations.

Figure 3B:
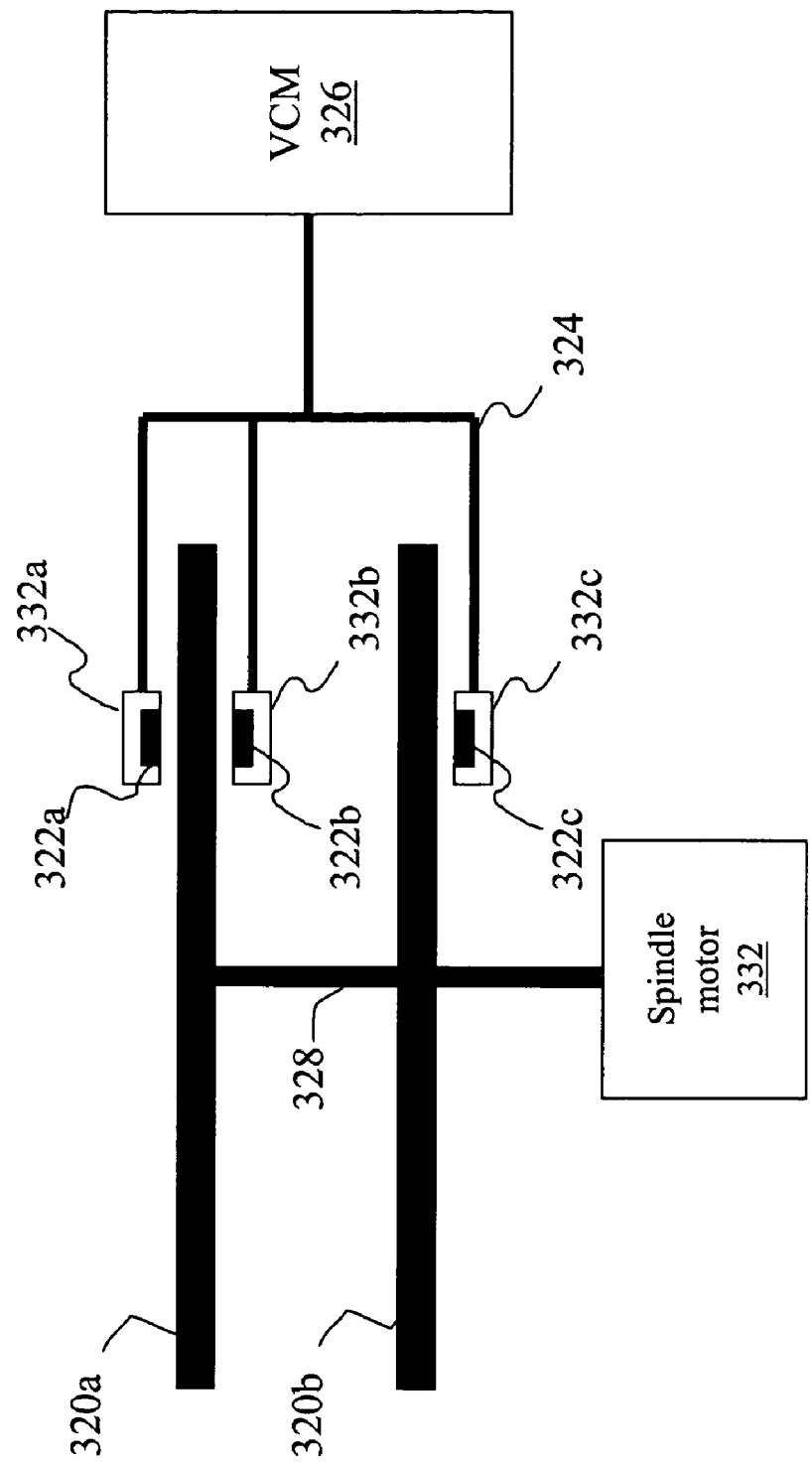
FIG. 3b illustrates additional detail of hard disks in the HDD.

With reference now to FIG. 3b, there is depicted additional detail of hard disks 320. Hard disks 320 are a stack of hard disk platters, shown in exemplary form as hard disks 320a–b. Preferably, more than two platters are used, but only two are shown for purposes of clarity. As a spindle motor 332 turns spindle 328, each hard disk 320 connected to spindle 328 rotates at speeds in excess of 10,000 Revolutions Per Minute (RPMs). Each hard disk 320 has two surfaces, one or both of which can be magnetized to store data. Thus, hard disk 320a is able to store data on both sides using read/write heads 322a and 322b. Hard disk 320b stores data on only one side using read/write head 322c. Thus, the system illustrated in FIG. 3b is a two-platter three-head HDD. By swinging the actuator arm 324 (and thus causing the movement of slider 332 and read/write head 322) and rotating the spindle 328 (and thus spinning hard disk 320), read/write head 322 can be positioned above any spot above the surface of hard disk 320.

Figure 4:
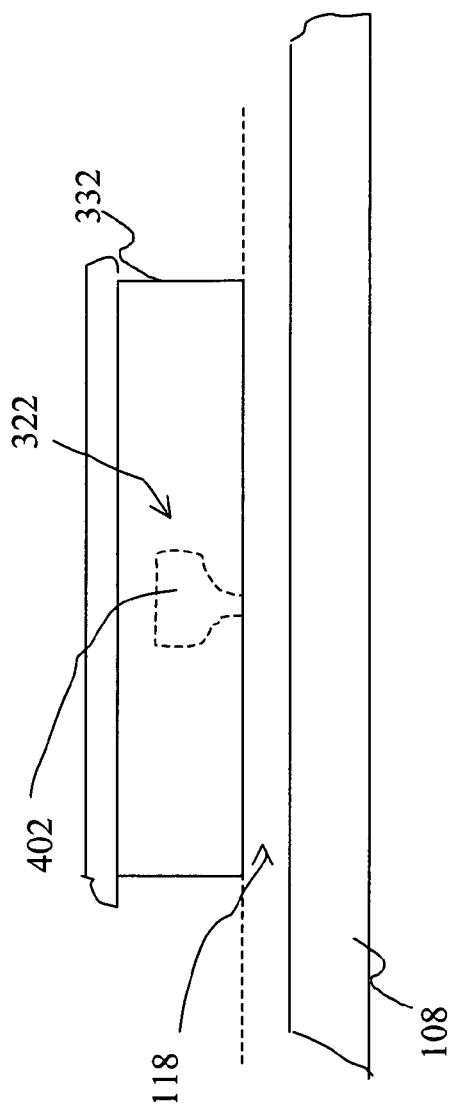
FIG. 4 depicts additional detail of a read/write head used in the HDD using the inventive write head.

With reference now to FIG. 4, there is depicted additional detail of magnetic read/write head 322. Magnetic read/write head 322, as the name implies, comprises both a read head and a write head, which are preferably separate components. While the read head is not depicted in FIG. 4, a write head 402 is depicted. Write head 402 is mounted within slider 332, and is aligned such that the write pole of write head 402 faces directly at the top surface of perpendicular recording medium 108.

Figure 5:
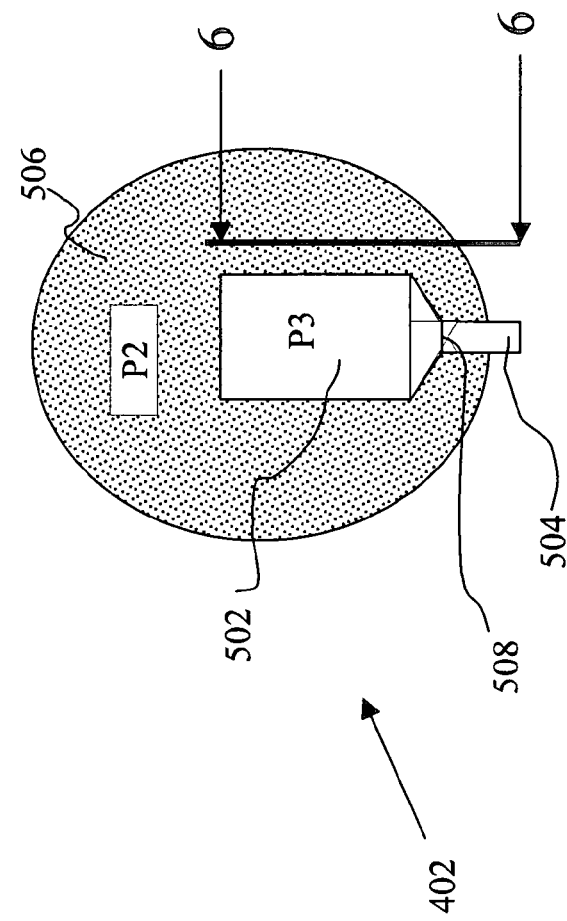
FIG. 5 illustrates additional detail of the inventive write head in a preferred embodiment.

Referring to FIG. 5, additional detail of write head 402 is given, showing a yoke 502 and a write pole tip 504, which together are referred to as P3, positioned above a flux guide 506, which is referred to as P2. Where write pole tip 504 meets yoke 502 is referenced as a flare point 508. More about P3 will be discussed below.

FIG. 6 provides a side view of write head 402 (not to scale) as viewed from orientation 6—6 shown in FIG. 5. Write head 402 includes write pole tip 504 next to air bearing surface (ABS) 118. Write pole tip 504 joins yoke 502 at flare point 508 to form P3. Flux source 608, typically coils, provides a flux field source to flux guide 506, which shapes the flux field from flux source 608 to yoke 502 and write pole tip 504. P1 602 provides a return pathway for flux from write pole tip 504 to perpendicular recording medium 108 (not shown in FIG. 6) and back to P1 602 during write operations. A leading edge taper (LET) 604, oriented between yoke 502 and flux guide 506 (P2) as shown, also shapes the flux field, between P2 and yoke 502 and write pole tip 504. The purpose of LET 604 will be discussed below in greater detail.

Also shown in FIG. 6 is the preferred orientation of a read head 610, which includes a read sensor 612, to write head 402. Read head 610 is capable of reading perpendicular recorded bits from a recording medium as described above.

FIGS. 7A–G and FIGS. 8A–H illustrate a series of steps taken in the present invention to fabricate the present inventive write head in its preferred embodiments.

For clarity, FIGS. 7A–F and 8A–G do not show flux source coils 608. Beginning then with FIG. 7A, a layer of sacrificial material 702 and a flux guide 506 are laid on top of P1 602, but separate from flux source 608 (not shown). Sacrificial material 702 and flux guide 506 are laid down using any method known to those skilled in the art of head fabrication, including various sputtering and other depositing techniques. Sacrificial material 702 is preferably aluminum oxide ($AL_2O_3$). P1 602 and flux guide 506 (P2) are magnetic materials known to those skilled in the art.

In a preferred embodiment for fabricating flux guide 506, a seed-layer is first laid down, followed by lithography to pattern flux guide 506, and then plating flux guide 506. The seed-layer is then removed with ion milling, and then sacrificial material 702 is deposited, followed by Chemical and Mechanical Polishing (CMP) to expose flux guide 506 (P2) and to define the thickness of P2.

Figure 7A:
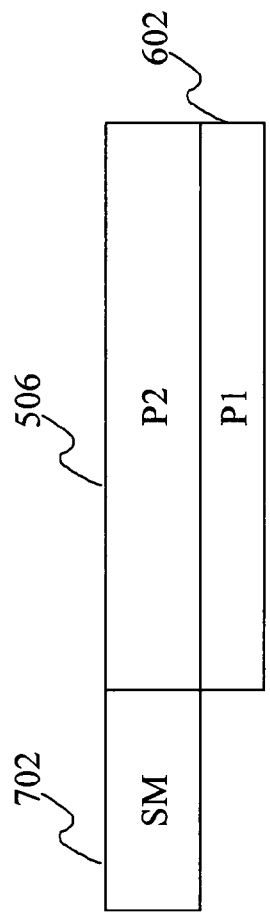
FIGS. 7A–G illustrate inventive steps taken to fabricate a write head having a leading edge taper for guiding flux to a write pole.
Figure 7B:
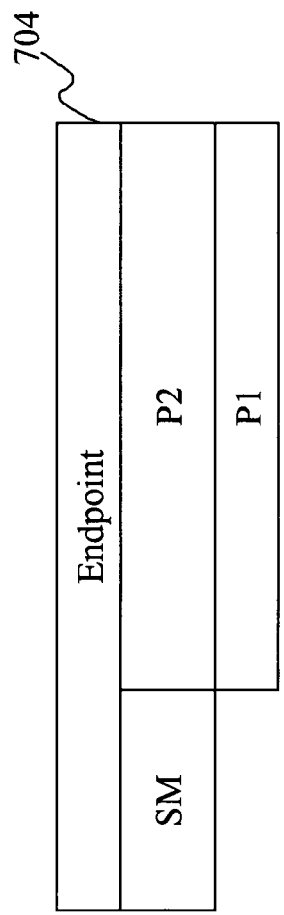

As shown in FIG. 7B, endpoint 704, which is an ion detector/deflector, is then laid down. Endpoint 704 may be Ruthenium (Ru), Rhodium (Rh) or Copper (Cu), but is preferably Chromium (CR) or Nickel Chrome (NiCr). Endpoint 704 is preferably 20–30Å thick. The purpose of endpoint 704 is to stop ion milling, as discussed below, from milling into flux guide 506 (P2) and other sub-stratifications. In addition, endpoint 704 provides a completely fabricated write head 402 with a magnetostatically decoupler (separator) between P3 and LET 714, shown below in FIG. 7G. Endpoint 704 also induces in-plane anisotropy and magnetic softness in the LET 714 layer.

Figure 7C:
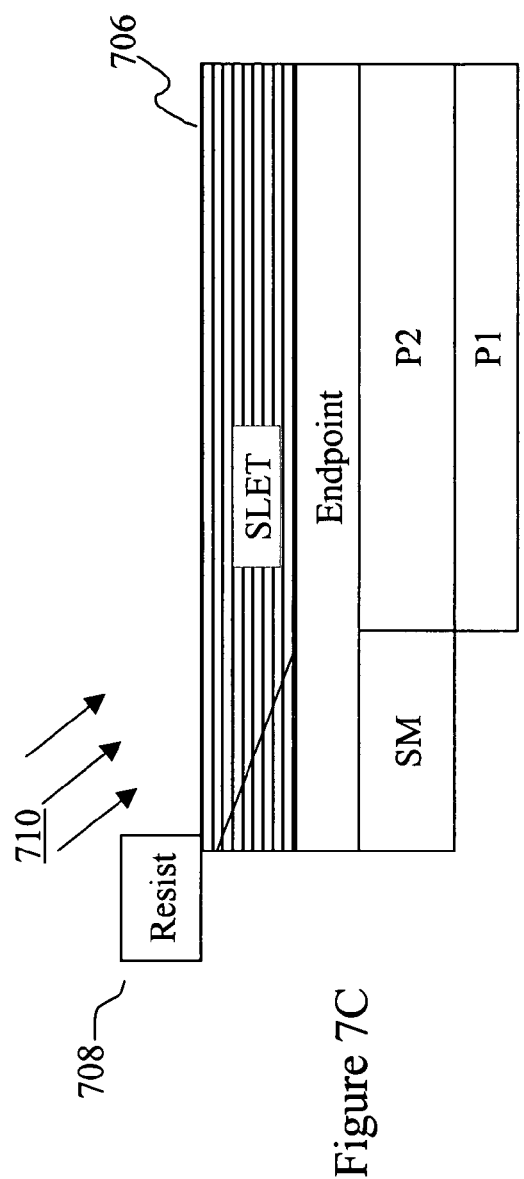
Figure 7D:
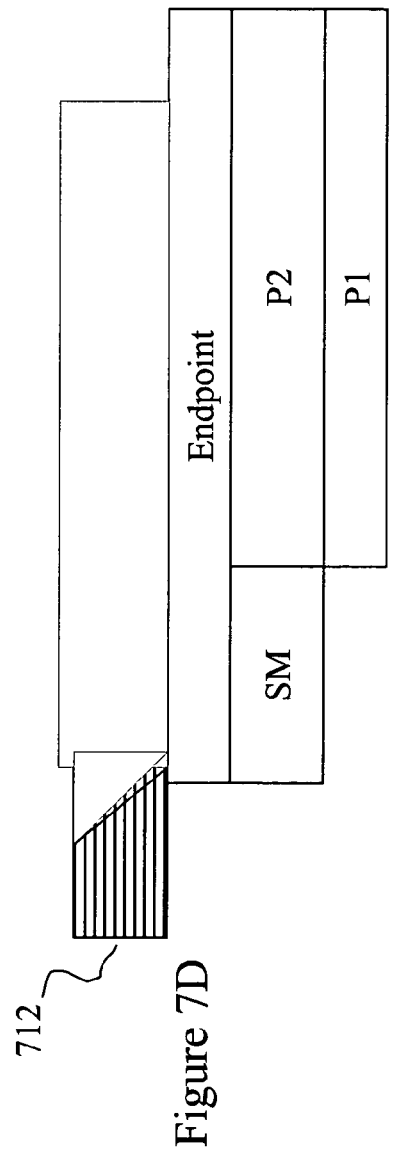

As shown in FIG. 7C, a sacrificial leading edge taper (SLET) 706 is then deposited on endpoint 704, and a resist 708 is laid at one end of SLET 706. SLET 706 is made up of layers of non-magnetic materials, such as combination of the following materials: $Al_2O_3$, Ru, Cr, $SiO_2$, Ta, SiOxN, $Si_3N_4$, etc. Preferably, the top layer of SLET 706 is of a material that is opaque to minimize reflectively to achieve tight overlay and critical dimension control. The layers are arranged to exploit the variation in the ion milling rates of these materials to create a steeper LET taper point (optimized at 45–50 degree). By controlling the thickness and placement of each film, the degree of tapering is thus well defined. Optionally, a CMP stop layer (not shown) is applied after the deposition of SLET 706.

The layers have different milling rates, such that the higher layers mill away faster than the lower layers when hit by ion beams 710. This unique property of SLET 706, along with the guidance provided by resist 708, and the ion milling conditions, results in the desired negative mold shown in FIG. 7D, in which only a residual sacrificial LET shaper 712 remains after the ion milling. Note that endpoint 704 has stopped the ion milling from passing through to the P2 or P1 layers.

Figure 7E:
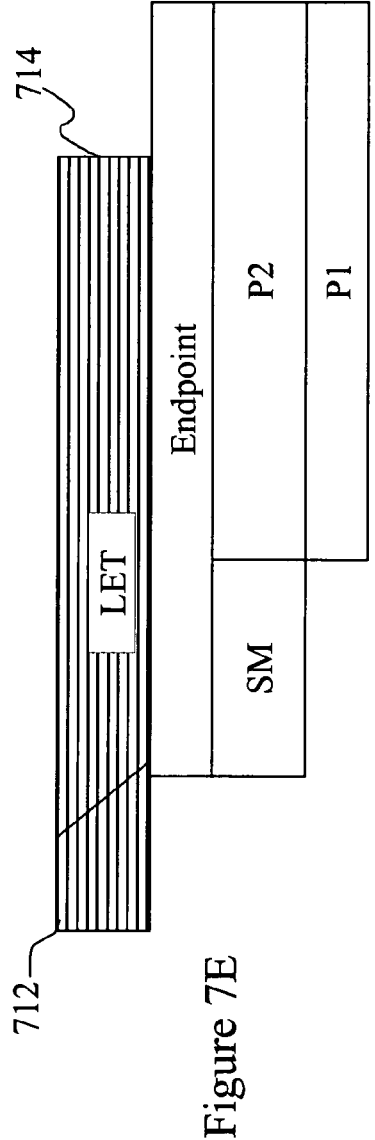
Figure 7F:
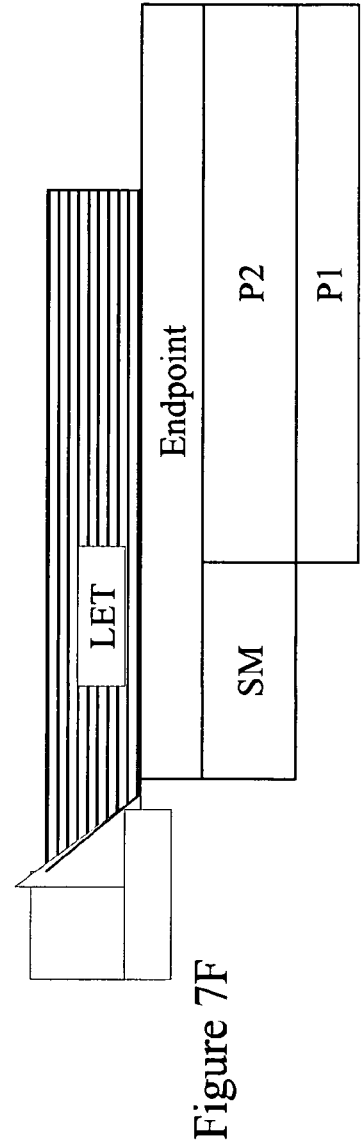

Next, magnetic material is laid into the space left by the milled SLET 706 to form LET 714, as shown in FIG. 7E. The magnetic material used to form LET 714 is preferably a high moment cobalt iron (CoFe), having 30–45% cobalt. Alternatively, LET 714 is made up of any CoFeX, where X is from a group of materials including nitrogen (N), boron (B) or nickel (Ni). The residual sacrificial LET shaper 712 is removed, leaving the structure shown in FIG. 7F. In a preferred embodiment, the resist 708 is removed by depositing CoFe on the resist 708 and residual sacrificial LET shaper 712, and then removing the newly deposited CoFe to remove both resist 708 and the residual sacrificial LET shaper 712.

The yoke 502 and write pole tip 504, together making up P3, are then laid down. In a preferred embodiment, P3 has alternating layers of magnetic and non-magnetic materials to inhibit remanence (writing after powering off due to stray fields).

Figure 7G:
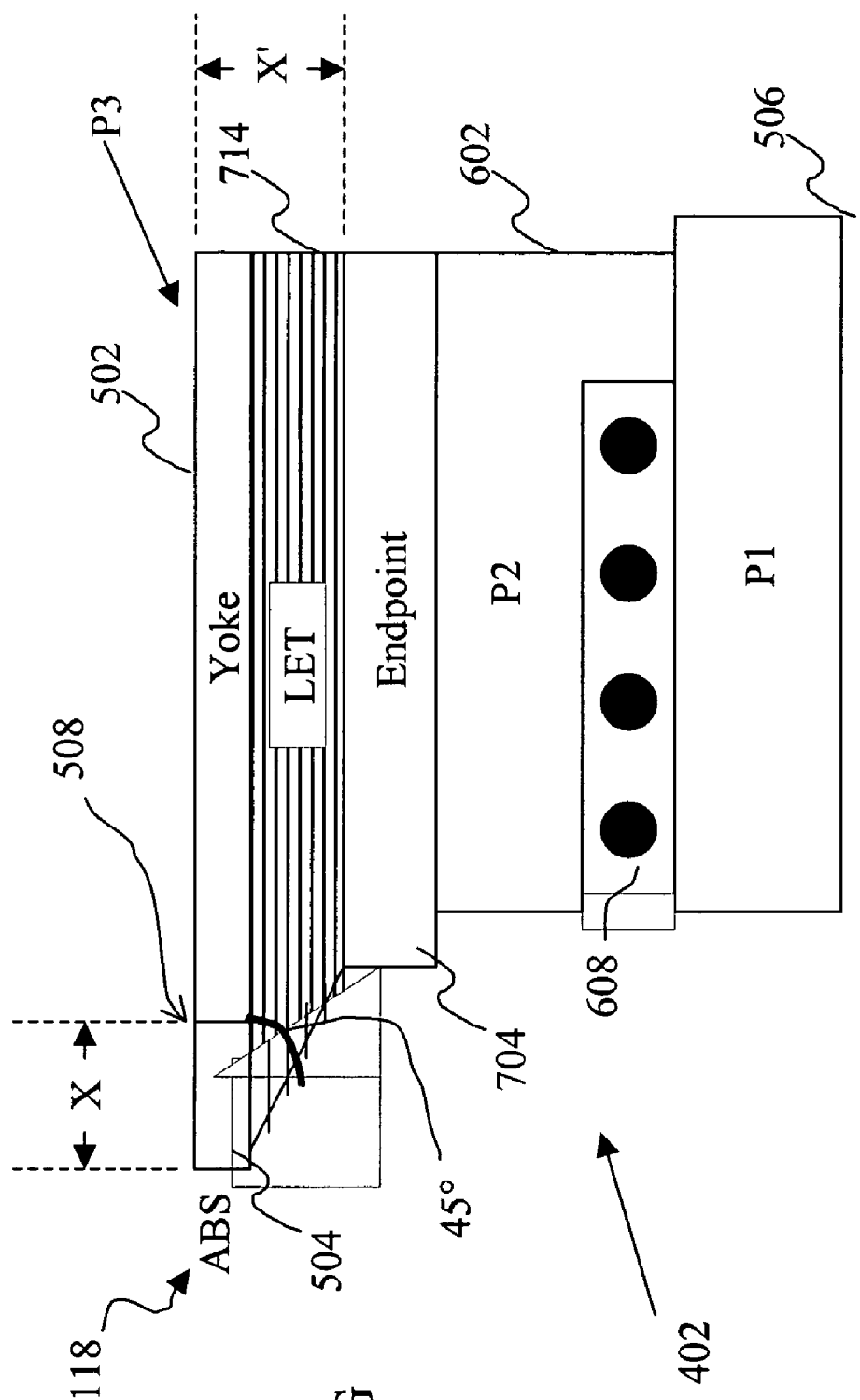

Magnetic LET 714's x-direction is defined by ion milling. That is, ion milling is applied to P3 to define the shape of P3, and this ion milling is extended to define LET 714. After both P3 and LET 714 are properly shaped with the ion milling, then the write head 402 having a magnetic LET 714, as shown in FIG. 7G, is complete.

The taper point of LET 714 has an angle between 40° and 50°, preferably 45°, as shown. This affords optimal shaping of flux between P2 and write pole P3, providing write pole P3 maximum flux strength for perpendicular writes in spite of the small cross section of write pole P3. Through the use of the specially chosen layers of non-magnetic materials used in SLET 706, a precise 45° shape can be achieved as shown.

Note further that the optimal distance from ABS 118 to flare point 508 is the combined thickness of yoke 502 and LET 714. These respective distances are shown on FIG. 7G as "X" and "X'." This optimal distance reduces remanence by suppressing shape anisotropy.

Trailing Edge Taper (TET) materials are thus incorporated into the P3 fabrication. The write pole-TET layers consist of P3 materials, the endpoint layer, and the TET materials. During the P3 ion milling to fabricate the write pole, the TET's x-direction is also defined because it is part of the write pole. The encapsulation and CMP steps provide a planar surface to create TET's tapering. The tapering is achieved by a combination of guidance provided by resist and the ion mill conditions. Ion milling is terminated when the endpoint material is exposed during milling, leaving a tapered structure.

With reference now to FIGS. 8A–H, there are depicted steps taken in a preferred embodiment to fabricate a write head having a TET. The steps are similar to those taken in fabricating the write head with an LET, except that all milling of TET is positive milling, without a formation of an intermediate negative cavity as described in the formation of LET. That is, the milling of the TET directly leads the positive final shape of the TET. Striations consisting of magnetic and non-magnetic materials form the TET. The non-magnetic material is kept thin in order to minimize the flux carrying capacity of the TET.

Figure 8A:
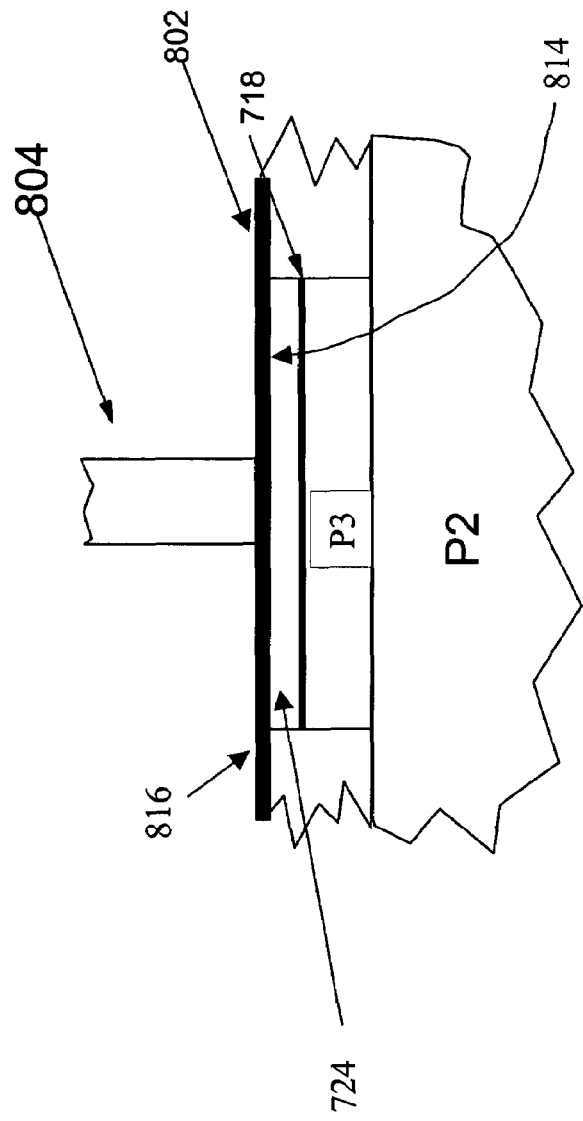

Starting with FIG. 8A, a high-resolution resist image 804 is laid atop a hard mask 802. Hard mask 802 preferably has a top layer of a resist such as Duramide™ 816 (a resist that can be covered into an oxide for better ion mill resistance for fabricating the write pole) and a bottom carbon layer 814. The hard mask 802 is atop a trailing edge taper (TET) 724, which has striations of magnetic materials having different milling rates, analogous to SLET 706. TET 724 is laid atop a trailing endpoint layer 718, which in a preferred embodiment is a non-magnetic material such as Ruthenium (Ru), having a preferable thickness of 8–10Å. Trailing endpoint layer 718, like endpoint 704 discussed above, ultimately provides anti-ferromagnetic (AF) decoupling of a magnetic component of TET 724 and a P3 layer, as shown in FIG. 8H. Trailing endpoint layer 718 is atop P3 and P2 as illustrated (coils 608 are not shown).

Figure 8B:
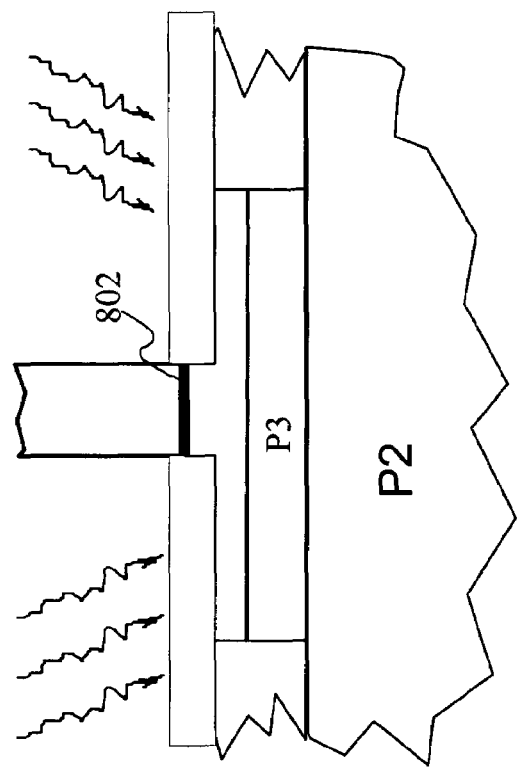
Figure 8C:
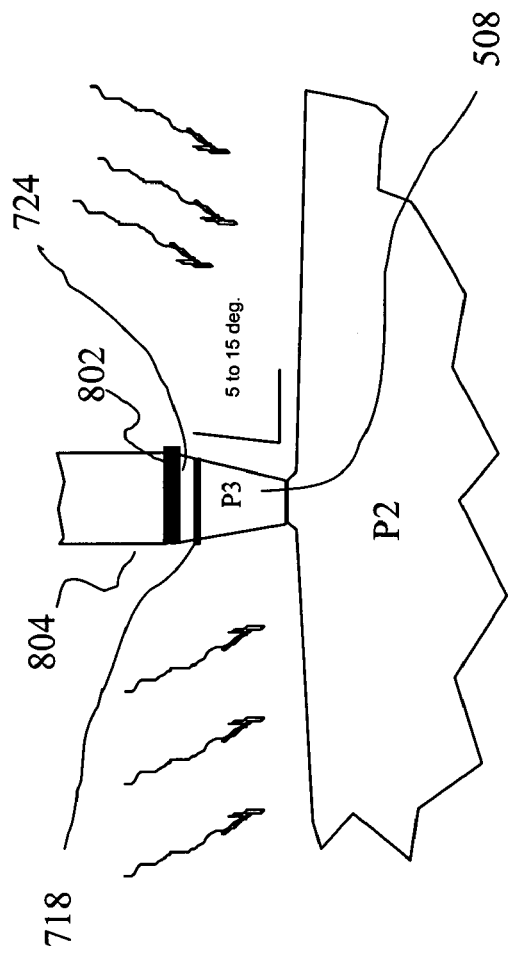

Referring now to FIG. 8B, hard mask 802 is then partially etched away using Reactive Ion Etching (RIE), a chemical etching process, to begin the shaping of P3. As seen in FIG. 8C, a second ion mill (physical ion milling process) is then used to mill away portions of the P3, trailing endpoint layer 718 and TET 724 to define a write pole with a pole bevel angle between 5 and 15 degrees, as illustrated.

Figure 8D:
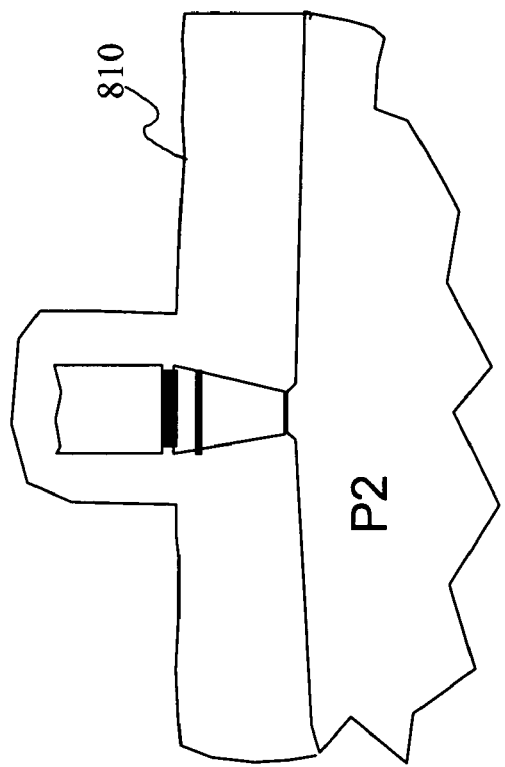

As seen in FIG. 8D, the structure is then encapsulated with an insulator 810, preferably alumina ($Al_2O_3$). It is important to note that the height of insulator 810 should be slightly higher than hard mask 802 during CMP and encapsulation. This encapsulation provides three benefits. First, the alumina provides additional physical strength to the small and fragile P3 write tip. Second, the alumina protects the environment of the write area from the corrosive material that makes up the P3. Third, the alumina creates a planar surface to define the trailing edge of P3.

As seen in FIG. 8E, a layer of carbon 812 is then deposited about insulator 810. Note that carbon 812 should be at a height that is slightly higher than insulator 810 so that milling will stop at carbon 812 to define the trailing edge of P3 and TET 724. The height of alumina 810 should be slightly higher than the hard mask 802 to provide write pole support during CMP. Deposition of DLC carbon on top of alumina 810 aids in the removal of hard mask 802 and redeposited materials during the P3 ion milling. Also, DLC carbon on top of alumina 810 reduces the CMP rate when hard mask 802 is removed to define the flatness of the trailing edge of P3.

Finally, as shown in FIG. 8F, the carbon 812 and alumina 810 layers are polished away using a Chemical and Mechanical Polishing (CMP) technique, which stops at carbon layer 814 of hard mask 802, while leaving Duramide layer 816 exposed.

FIG. 8G is a side-view of FIG. 8F. Magnetic TET 724, comprised of striated layers of metallic material having different ion milling rates, is partially covered with a resist 820, which afford the tapered edge of TET 724 through ion milling, leaving the final TET 724 shape shown in FIG. 8H. Thus, TET 724 has striations of magnetic and non-magnetic materials that have different milling rates to promote the tapered shape shown with the non-magnetic material being thin enough to minimize the flux carrying capacity of the TET 724. As with LET 714 discussed above, the taper point of TET 724 preferably is shaped at an angle between 40° and 50°, preferably 45°.

To illustrate a preferred orientation of write head 402 having a TET 724, FIG. 8H also depicts a read head 726, which includes a read sensor 728. Read head 726 is preferably a tri-layer construction oriented adjacent P1 602 as illustrated.

Figure 9:
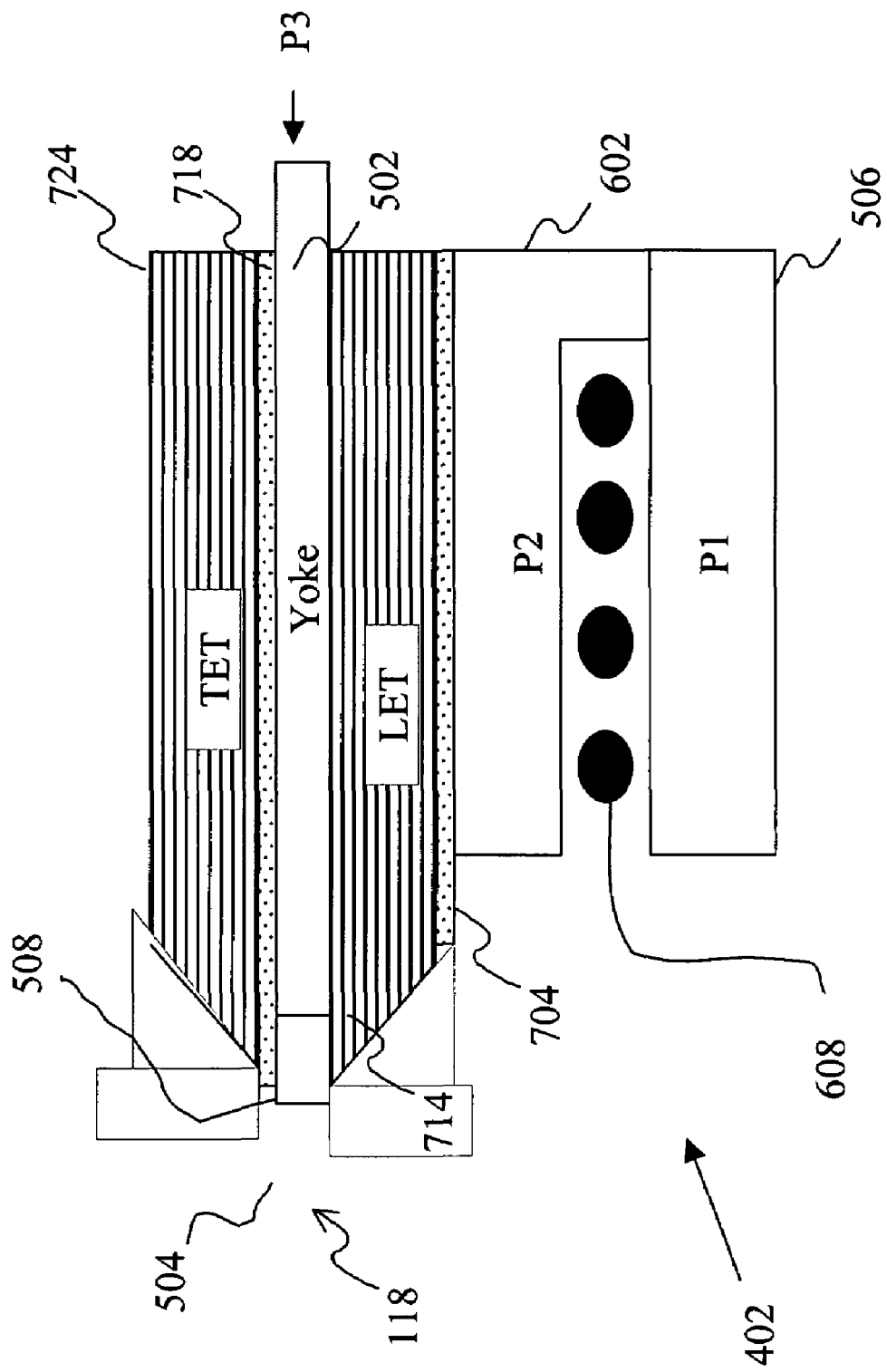
FIG. 9 depicts an inventive write head having both trailing and leading edge tapers.

In an alternative embodiment, the techniques described above to form TET 724 and LET 714 can be combined to achieve a write head 402 having both TET 724 and LET 714, to produce a write head 402 as shown in FIG. 9. Preferably, the process for forming LET 714 is performed first as described above, followed by the fabrication of TET 724 as described above.

The present invention therefore affords a method of manufacturing a write head having edge tapers that optimize the strength of flux reaching P3 for perpendicular writes. Flux is generated by flux source 608, and the flux then passes in a controlled manner from P3 to the perpendicular recoding medium 108 to P1 with the shaping provided by P3 and the edge taper(s), but without creating remanence or ATI issues that would be caused without the precision of the taper to the edge(s) that the present invention affords. Upon completion of fabrication, the endpoints used to control milling are thin enough such that the endpoints do not affect the operation of either P2 or the edge tapers. Further, the material used to fabricate the endpoints are preferably magnetically transparent.

While the invention has been particularly shown and described with reference to a preferred embodiment, it will be understood by those skilled in the art that various changes in form and detail may be made therein without departing from the spirit and scope of the invention. It is also noted that none of the figures depicting the present invention are to be viewed as being to scale, unless otherwise noted.

What is claimed is:

1. A method for fabricating a write head, the method comprising:
   laying an endpoint on a magnetic flux guide, the endpoint being resistant to milling;
   laying a sacrificial edge taper on the flux guide, the sacrificial edge taper having layers of different materials that have different milling rates;
   milling the sacrificial edge taper such that the different materials mill at different rates to create a desired angle for a negative mold; and
   filling the negative mold with a magnetic material to form a final edge taper for guiding flux to a write pole near the edge taper.

2. The method of claim 1, further comprising:
   laying a P3 layer against the final edge taper, the P3 layer comprising a yoke joined to a write pole tip at a flare point, the write pole tip having a tip end that abuts an air bearing surface (ABS) of a disk, wherein a distance from the ABS to the flare point is the same as a combined thickness of the yoke and the final edge taper.

3. The method of claim 1, wherein the milling is ion milling.

4. The method of claim 3, wherein the endpoint resists ion milling.

5. The method of claim 4, wherein the endpoint comprises a material from a group including rhodium, ruthenium, nickel chromium and copper.

6. The method of claim 1, wherein the edge taper is a leading edge taper.

7. The method of claim 1, further comprising:
   layering a trailing edge taper (TET) on a trailing endpoint layer, the trailing endpoint adjacent the write pole; and
   milling away the TET to create a taper point.

8. The method of claim 7, wherein the trailing endpoint layer comprises layers of different materials that have different milling rates, thus producing a controlled tapered shape.

9. The method of claim 8, wherein the taper point is between 40° and 50°.

10. The method of claim 8, wherein the trailing endpoint layer comprises a material from a group including rhodium, ruthenium, nickel chromium and copper.

* * * * *